Sept. 19, 1939.  F. LE ROY  2,173,209
KNEADING MACHINE
Filed June 26, 1937  2 Sheets-Sheet 1

F. Le Roy
INVENTOR

By: Glascock Downing & Seebohm
Attys.

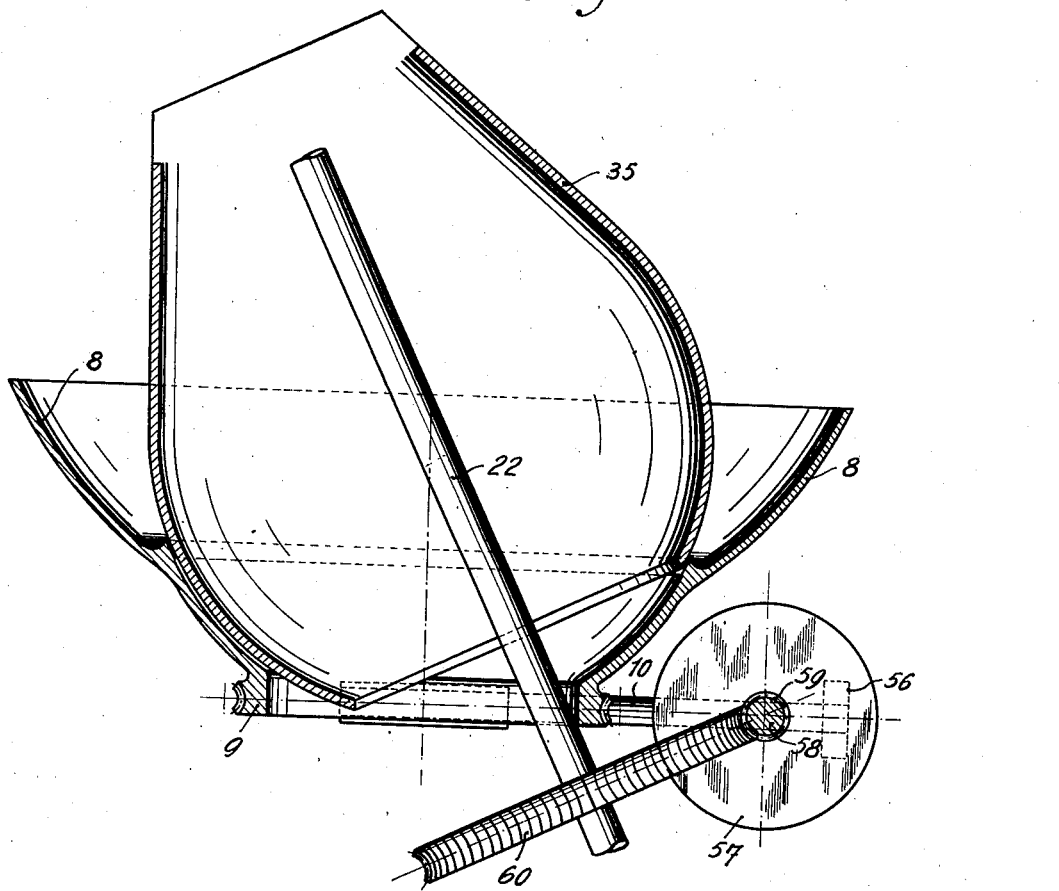

Patented Sept. 19, 1939

2,173,209

UNITED STATES PATENT OFFICE 2,173,209

KNEADING MACHINE

Frédéric Le Roy, Anvers, Belgium, assignor to Madam Le Roy-Dewinter, Anvers, Belgium Application June 26, 1937, Serial No. 150,647
In Belgium June 29, 1936

3 Claims. (Cl. 107—9)

It is known that the kneading of dough with the hand, termed in the baking industry "rolling" or "mixing" is a fatiguing operation since this mixing becomes more and more irregular in order not to be superficial and, therefore, insufficient at the end of a certain time. Furthermore, the production is also affected by the fatigue which is caused by this tedious operation.

The kneading machine forming the subject matter of the present invention permits the substitution of mechanical kneading for rolling or mixing by hand. It is of the kind comprising a working chamber comprised between an outer body subjected to a rotary movement and a second inner body rotating in a direction opposite to the first.

According to the invention the relative speeds of these bodies are adapted to be varied according to the nature of the product to be treated, in such a way as to impart to the material in the working chamber a movement the amplitude of which depends on the difference of speeds of the moving bodies.

Another feature of the invention consists in a stationary member of spiral form immersed in the working chamber and enveloping the inner body in such a way as to abut at a suitable angle against the top of said body with the object of discharging the worked product.

In the accompanying drawings:

Figure 2 is a similar sectional view with a modified motion device.

Figure 1:
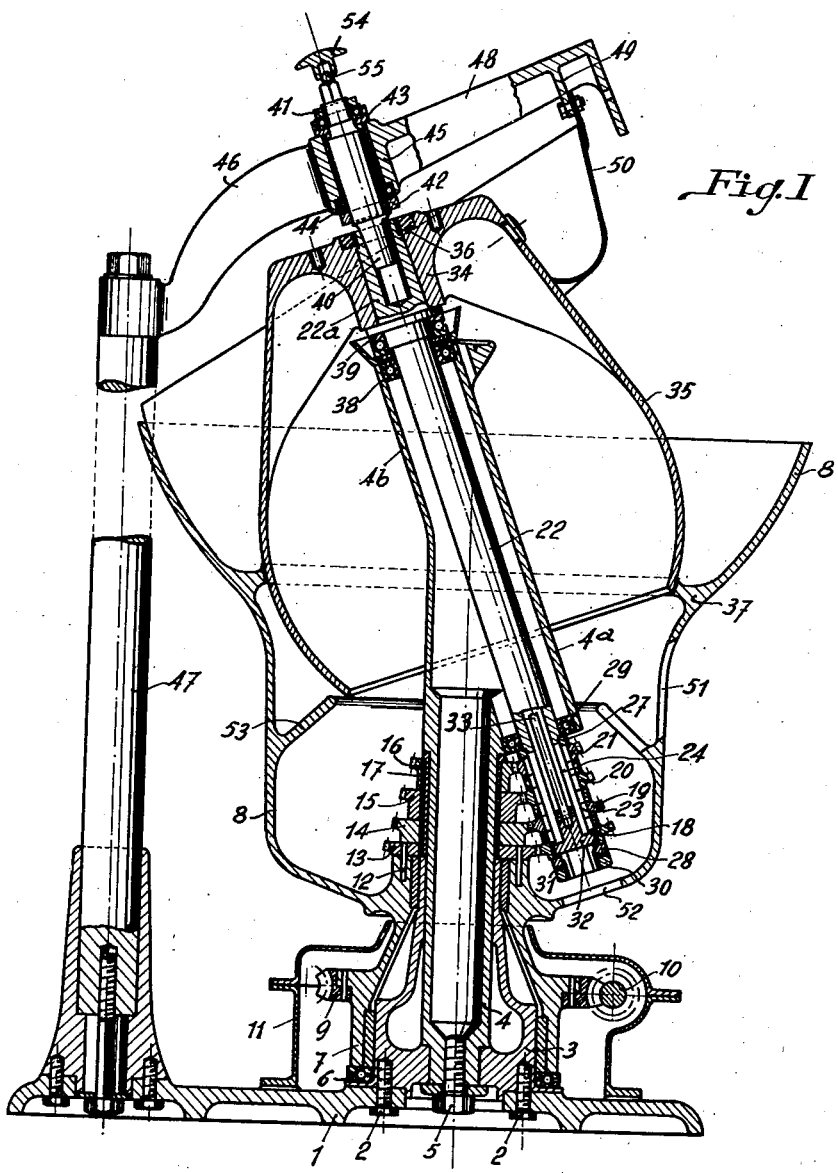
Figure 1 is a vertical section of the kneading machine.

According to Fig. 1 on a pedestal 1 is secured by screws 2 a footstep 3 in which is centrally lodged a tube 4 held by a screw 5. By means of a ball bearing 6 is supported externally to the footstep a bushing 7 integral with a tank 8 of special form and integral with a screw wheel 9 with which gears an endless screw 10 coupled directly to an electric motor, not shown. A casing 11 encloses these driving members and serves as a bearing for the endless screw 10; this casing fixed in a fluid tight manner on the pedestal 1 of the machine confines the oil in which the ball bearing 6 is immersed.

In the upper part of the bushing 7 of the tank are provided pins 12 traversing a first toothed wheel 13 with which are rendered integral successive wheels 14, 15, 16 by means of a key 17 traversing these wheels as well as a bronze ferrule 4' mounted on the central tube 4. These wheels 13, 14, 15 and 16 each have a predetermined number of teeth and engage respectively with wheels 18, 19, 20 and 21 having the same number of teeth. The latter are freely mounted on a shaft 22 and each have grooves 23 corresponding diametrically to transverse notch 24 provided in shaft 22. Rings 25 also provided with grooves 26 corresponding to those of the shaft 22 separate the wheels 18—21 from one another while plain rings 27 and 28 hold the toothed wheels between a ball bearing 29 and a nut 30 which a safety washer 31 prevents from becoming accidentally loose. The smooth rings 27 and 28 also serve as a stop for limiting the path of a slide piece 32 to which is secured a rod 33 lodged inside the shaft 22 which it traverses over the whole of its length.

Above the differential mechanism formed by the paired wheels 18 to 21, the shaft 22 passes obliquely into a widened part 4a of the tube 4 and is extended axially into an upper bent part 4b of the latter in order to terminate at a conical seat 22a keyed into a bushing 34 of a body 35 of pear-shape form which is thus immersed in the tank 8. The pear-shaped body 35 locked by a screwthreaded ring 36 is corrugated on its outer part.

The annular space or working chamber of characteristic profile formed between the tank 8 and the pear-shaped body 35 is limited at the lower part of a projecting ring 37 formed by a rib of the tank and curved so as to correspond to the outer curvature of the pear-shaped body 35.

The shaft 22 is held in place by ball bearings 38, 39 mounted at the upper part of the tube 4 and by the ball bearing 29 mounted over the train of gears 18 to 21. Furthermore, in the boss 22a of the shaft 22 is lodged a shaft 40 provided with rings 41 and 42 and stops 43 and 44; this shaft passes through a bushing 45 carried by arms 46 each connected respectively to standards 47 integral with the pedestal 1. Beyond the two arms 46 the bushing 45 carries a third arm 48 terminated by claws 49 to which is secured the expelling member 50 of spiral form. The latter is immersed in the working chamber of the machine and envelops the inner body 35 in such a way as to abut at a suitable angle against the top of said body.

Ports 51 and 52 are provided in the lower part of tank 8 to permit the removal of substances which, passing between the pear-shaped body and the tank, are retained by an annular internal partition 53 provided inside the latter and at the same time to superintend or adjust the differential mechanism.

Beyond the shaft 40 which it traverses centrally as well as the shaft 22 extends a rod 33 of the slide piece 32; this rod carries above the bushing 45 an operating knob 54 and may be locked into any determined position by a ball 55.

From this description it will be seen that the tank 8 and the pear-shaped body 35 rotate in a continuous manner in opposite directions to one another at a speed determined by the position of the slide piece 32 which renders the wheel in which it is engaged integral with the shaft 22. Consequently, whereas the tank 8 rotates at a constant speed, the pear-shaped body can rotate at four different speeds according to the position of the slide piece; these speeds are preferably arranged for lumps of dough of ½ kg., 1 kg., 1½ kgs., and 2 kgs.

The speed of the pear-shaped body having been previously adjusted by operating on the adjusting knob 54, the dough is caused to fall from a hopper (not shown) carried by the arm 48 into the cavity formed between the wall and the tank, and as these members rotate in opposite directions the dough is driven by the members having the greatest lineal speed. During the path which the lump of dough follows in the tank it is subjected to a kneading operation assisted by the shape of the walls of the operating chamber up to the instant where it arrives at the base of the worm into which it is driven by the pear-shaped body. The dough thus rises in the worm which expels it finally outside the apparatus in order to deliver it to a table or other suitable conveying member.

As it has been said the invention is not confined to the means previously described to obtain the opposite and variable rotation movements of the members 8 and 35. Other equivalent constructional forms may be used for the purpose specified, for example (Fig. 2) the screw wheel 9 may gear with an endless screw 10, on the axis of which is mounted a friction disc 56 in contact with a friction wheel 57. The shaft 58 of said friction wheel 57 carries an endless screw 59 gearing with a screw wheel 60 keyed to the shaft 22 of the pear-shaped member 35. The friction disc 56 being longitudinally moveable on the axis of the endless screw 10, the transmitted speed will be modified in accordance with the position of said disc.

I claim:

1. In a kneading machine, a rotating outer body and a rotating inner body, a working chamber between said bodies, means for imparting rotary movement to one of said bodies, a change speed gear connecting said bodies for varying the relative speed thereof, said outer body forming an enclosure for said gear, and means for adjusting said change speed gear during rotation of said bodies.

2. A machine as claimed in claim 1 characterized in that said change speed gear and the adjusting means therefor include a series of gear wheels connected with the outer body, a drive shaft for the inner body journaled in an extended part of the outer body, a group of gear wheels loosely mounted on the drive shaft and engaging the first mentioned gear wheels, and means for selectively coupling the second mentioned gear wheels with the drive shaft.

3. A machine as claimed in claim 1 characterized by the provision of a spiral member positioned between said bodies and extending about the inner body and abutting the latter at an angle suitable for discharging the kneaded material.

FRÉDÉRIC LE ROY.